United States Patent
Takakura et al.

(10) Patent No.: US 10,214,205 B2
(45) Date of Patent: Feb. 26, 2019

(54) HYBRID VEHICLE

(71) Applicant: TOYOTA JIDOSHA KABUSHIKI KAISHA, Toyota-shi, Aichi-ken (JP)

(72) Inventors: Shikoh Takakura, Toyota (JP); Shinichiro Minegishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/805,337

(22) Filed: Nov. 7, 2017

(65) Prior Publication Data

US 2018/0134280 A1 May 17, 2018

(30) Foreign Application Priority Data

Nov. 16, 2016 (JP) ................. 2016-223059

(51) Int. Cl.
*B60W 10/06* (2006.01)
*B60W 10/08* (2006.01)
*B60W 10/26* (2006.01)
*B60W 20/50* (2016.01)

(52) U.S. Cl.
CPC ............ *B60W 20/50* (2013.01); *B60W 10/06* (2013.01); *B60W 10/08* (2013.01); *B60W 2540/10* (2013.01); *B60W 2710/30* (2013.01); *Y10S 903/93* (2013.01)

(58) Field of Classification Search
CPC ...... B60W 10/06; B60W 10/08; B60W 10/26; B60W 20/00; B60W 20/50; B60W 2710/08
See application file for complete search history.

(56) References Cited

U.S. PATENT DOCUMENTS

| 2013/0116078 | A1 | 5/2013 | Hokoi |
| 2016/0142000 | A1* | 5/2016 | Oba ................. B60L 11/12 318/400.04 |
| 2016/0152128 | A1* | 6/2016 | Minegishi ........... B60W 10/06 180/65.265 |
| 2016/0153419 | A1* | 6/2016 | Minegishi .......... F02N 11/0866 290/38 C |
| 2016/0303948 | A1* | 10/2016 | Sakai .................. B60L 1/003 |

FOREIGN PATENT DOCUMENTS

| JP | 2010-215106 | 9/2010 |
| JP | 2013-099977 A | 5/2013 |
| JP | 2014-103709 | 6/2014 |
| JP | 2014-184880 | 10/2014 |

* cited by examiner

*Primary Examiner* — Bryan A Evans
(74) *Attorney, Agent, or Firm* — Finnegan, Henderson, Farabow, Garrett & Dunner, LLP (57) ABSTRACT

A hybrid vehicle includes an engine; a generator that generates a counter-electromotive force; a motor; a first inverter for the generator; a second inverter for the motor; a step-up converter that steps up an electric power of a first voltage system electric power line and supplies the electric power to a second voltage system electric power line; and a smoothing capacitor of the second voltage system electric power line. In a case where the hybrid vehicle travels by driving the engine in a state in which the stepping up by the step-up converter and an operation of the first inverter are stopped when an abnormality occurs in a voltage sensor, when an electronic control unit determines that there is an indication that the voltage of the capacitor will rise, the first inverter is controlled to cause three phases of the first inverter to be in an ON state.

4 Claims, 8 Drawing Sheets

HYBRID VEHICLE

INCORPORATION BY REFERENCE

The disclosure of Japanese Patent Application No. 2016-223059 filed on Nov. 16, 2016 including the specification, drawings and abstract is incorporated herein by reference in its entirety.

BACKGROUND

1. Technical Field

The present disclosure relates to a hybrid vehicle.

2. Description of Related Art

In the related art, a hybrid vehicle in which an engine, a generator, and a driving shaft connected to a vehicle axle are connected to a planetary gear, a motor is connected to the driving shaft, and a step-up converter that steps up electric power from a battery and supplies the electric power to a first inverter for driving the generator and a second inverter for driving the motor is provided, is proposed (for example, refer to Japanese Unexamined Patent Application Publication No. 2014-184880 (JP 2014-184880A)). In the hybrid vehicle, when the generator cannot be normally driven, the stepping-up by the step-up converter and the operation of the first inverter are stopped, and a counter-electromotive force generated in the generator due to the driving of the engine is supplied to the motor such that the hybrid vehicle travels in a limp home mode. At this time, the counter-electromotive force of the generator is estimated, and a torque command for the motor is determined based on the estimated counter-electromotive force.

SUMMARY

In the hybrid vehicle described above, a smoothing capacitor is attached to electric power lines provided for the first inverter and the second inverter, and a voltage sensor that detects the voltage between the terminals of the capacitor (the voltage between the electric power lines) is also attached such that the driving of the motor is controlled based on the voltage detected by the voltage sensor. Therefore, when an abnormality occurs in the voltage sensor and the voltage between the terminals of the capacitor (the voltage between the electric power lines) fluctuates, the drive control of the motor fails, and the hybrid vehicle cannot travel in the limp home mode. In this case, stopping the driving of the engine and traveling of the hybrid vehicle in the limp home mode solely using the electric power from the battery may be considered. However, in this case, the traveling distance of the hybrid vehicle becomes short and the vehicle speed becomes low.

The present disclosure provides a hybrid vehicle in which, when an abnormality occurs in a voltage sensor, and the hybrid vehicle travels by driving an engine in a state in which stepping up by a step-up converter is stopped and an operation of an inverter of a generator is stopped, failure of drive control of a motor is suppressed.

An aspect of the present disclosure relates to a hybrid vehicle. The hybrid vehicle includes an engine; a generator configured to generate a counter-electromotive force due to rotation of the engine; a motor configured to output a traveling power of the hybrid vehicle; a first inverter configured to drive the generator; a second inverter configured to drive the motor; a power storage device; a first voltage system electric power line connected to the power storage device; a second voltage system electric power line connected to the first inverter and the second inverter; a step-up converter connected to the first voltage system electric power line and the second voltage system electric power line, the step-up converter being configured to step up a direct-current electric power of the first voltage system electric power line and supply the direct-current electric power to the second voltage system electric power line; a smoothing capacitor attached to the second voltage system electric power line; a voltage sensor configured to detect a voltage between terminals of the capacitor; and an electronic control unit. The electronic control unit is configured to control the engine, the first inverter, the second inverter, and the step-up converter. The electronic control unit is configured to control the step-up converter to stop the stepping up by the step-up converter when the electronic control unit determines that an abnormality occurs in the voltage sensor. The electronic control unit is configured to control the first inverter to cause three phases of the first inverter to be in an ON state when the hybrid vehicle travels by driving the engine in a state in which an operation of the first inverter is stopped, and the electronic control unit determines that there is an indication that a voltage of the capacitor will rise.

With the hybrid vehicle according to the aspect, in the state in which the stepping up by the step-up converter is stopped when an abnormality occurs in the voltage sensor, the counter-electromotive force generated in the generator by stopping the operation of the first inverter and driving the engine is supplied to the motor via the second inverter such that the hybrid vehicle travels in a limp home mode. At this time, when power consumption of the motor is equal to or higher than the counter-electromotive force in the generator, the electric power from the first voltage system electric power line to which the power storage device is connected is supplied to the second voltage system electric power line connected the first inverter and the second inverter, via the step-up converter that stopped the stepping up. Therefore, the voltage of the second voltage system electric power line becomes the same as the voltage of the first voltage system electric power line, and the driving of the motor can be controlled using the voltage of the first voltage system electric power line. On the other hand, when the power consumption of the motor is lower than the counter-electromotive force in the generator, since the stepping up by the step-up converter is stopped, the voltage of the second voltage system electric power line rises. Therefore, when the driving of the motor is controlled using the voltage of the first voltage system electric power line, the control fails. In the hybrid vehicle, three-phase of the first inverter is caused to be ON when the electronic control unit determines that there is an indication that the voltage between the terminals of the smoothing capacitor attached to the second voltage system electric power line (the voltage of the second voltage system electric power line) will rise. Accordingly, a closed circuit is formed in the U-phase, the V-phase, and the W-phase of the generator, and no counter-electromotive force is generated. Therefore, the rise of the voltage of the second voltage system electric power line is suppressed, and the drive control of the motor using the voltage of the first voltage system electric power line can be continued. As a result, failure of the drive control of the motor can be suppressed, and the hybrid vehicle can continue traveling in the limp home mode.

In the hybrid vehicle according to the aspect, the electronic control unit may be configured to determine that there is an indication that the voltage of the capacitor will rise when a power needed for the motor becomes a predetermined power or lower due to an operation of a driver of the hybrid vehicle. Here, "power" may be obtained by multiplying the torque needed for the motor by the rotational speed of the motor, and may also be a traveling power in a case where the hybrid vehicle travels solely using the power from the motor.

The hybrid vehicle according to the aspect may further include an accelerator operation amount sensor configured to detect an operation amount of an accelerator pedal configured to be operated by the driver of the hybrid vehicle. The electronic control unit may be configured to determine that there is an indication that the voltage of the capacitor will rise when an accelerator operation amount detected by the accelerator operation amount sensor becomes a predetermined value or lower. This is based on the fact that since the magnitude of the accelerator operation amount is closely related to the magnitude of the torque needed for the motor, when the accelerator operation amount is equal to or lower than a predetermined value, the power needed for the motor decreases, and power consumption of the motor becomes lower than the counter-electromotive force in the generator.

In the hybrid vehicle according to the aspect, the electronic control unit may be configured to control the first inverter to stop an operation of the first inverter when the electronic control unit determines that there is no indication that the voltage of the capacitor will rise. When the electronic control unit determines that there is no indication that the voltage of the capacitor will rise, it is thought that power consumption of the motor becomes equal to or higher than the counter-electromotive force in the generator. Therefore, by stopping the operation of the inverter that causes the three-phase ON, the counter-electromotive force is generated in the generator and can be supplied to the motor.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments for carrying out the present disclosure will be described with reference to examples.

Figure 1:
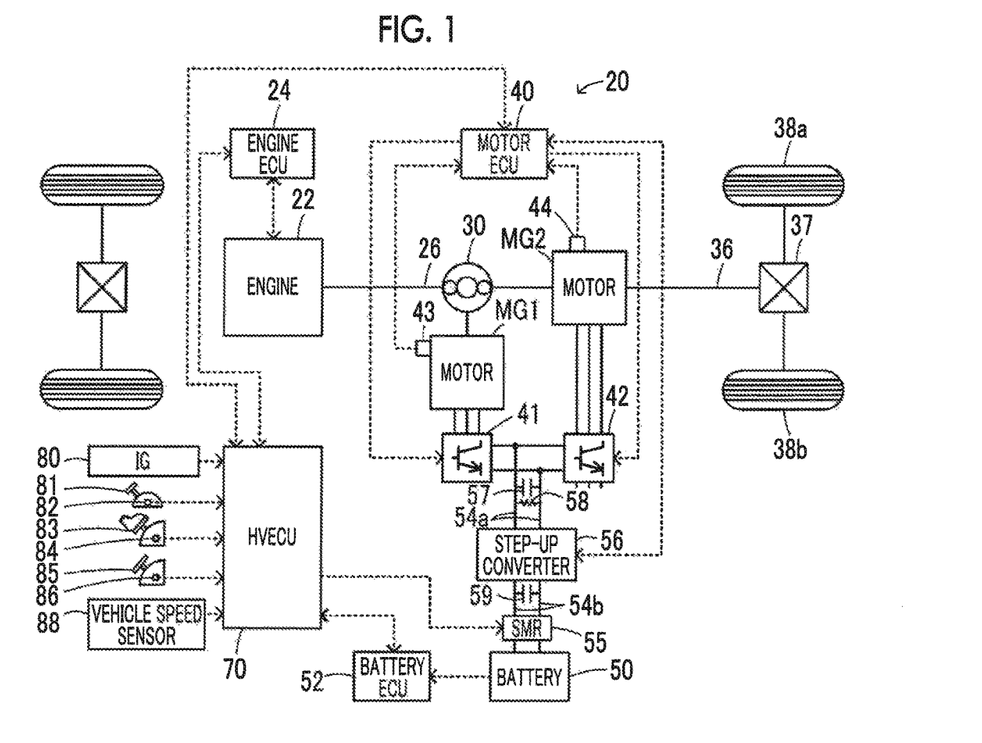
FIG. 1 is a configuration diagram schematically illustrating a configuration of a hybrid vehicle as an example of the present disclosure.

FIG. 1 is a configuration diagram schematically illustrating a configuration of a hybrid vehicle 20 as an example of the present disclosure. As illustrated in FIG. 1, the hybrid vehicle 20 of the example includes an engine 22, an engine electronic control unit (hereinafter, referred to as "engine ECU") 24, a planetary gear 30, a motor MG1, a motor MG2, inverters 41, 42, a motor electronic control unit (hereinafter, referred to as "motor ECU") 40, a battery 50, a battery electronic control unit (hereinafter referred to as "battery ECU") 52, a step-up converter 56, and a hybrid vehicle electronic control unit (hereinafter, referred to as "HVECU") 70.

The engine 22 is configured as an internal combustion engine that outputs power using general gasoline, diesel fuel, or the like as a fuel, and the driving of the engine 22 is controlled by the engine ECU 24. Although not illustrated in the figure, the engine ECU 24 is configured as a microprocessor mainly including a CPU, and includes, in addition to the CPU, a ROM that stores processing programs, a RAM that temporarily stores data, input/output ports, and communication ports. Signals from various sensors that detect the operation state of the engine 22, for example, a crank position θcr from a crank position sensor that detects the rotational position of a crankshaft 26, a coolant temperature Twe from a coolant temperature sensor that measures the temperature of the coolant of the engine 22, an intake air amount Qa from an air flow meter attached to an intake pipe, and an intake air temperature Ta from a temperature sensor attached to the intake pipe, are input to the engine ECU 24 via the input ports. Various control signals for driving the engine 22, for example, a drive signal for a fuel injection valve, a drive signal for a throttle motor that adjusts the position of a throttle valve, and a control signal for an ignition coil integrated with an igniter, are output from the engine ECU 24 via the output ports. In addition, the engine ECU 24 communicates with the HVECU 70, controls the operation of the engine 22 according to control signals from the HVECU 70, and outputs data regarding the operation state of the engine 22 to the HVECU 70 as needed. The engine ECU 24 also calculates the rotational speed of the crankshaft 26, that is, a rotational speed Ne of the engine 22 based on the signal from the crank position sensor (not illustrated) attached to the crankshaft 26.

The planetary gear 30 is configured as a single-pinion planetary gear mechanism. The rotor of the motor MG1, a driving shaft 36 connected to driving wheels 38$a$, 38$b$ via a differential gear 37, and the crankshaft 26 of the engine 22 are respectively connected to the sun gear, the ring gear, and the carrier of the planetary gear 30.

Figure 2:
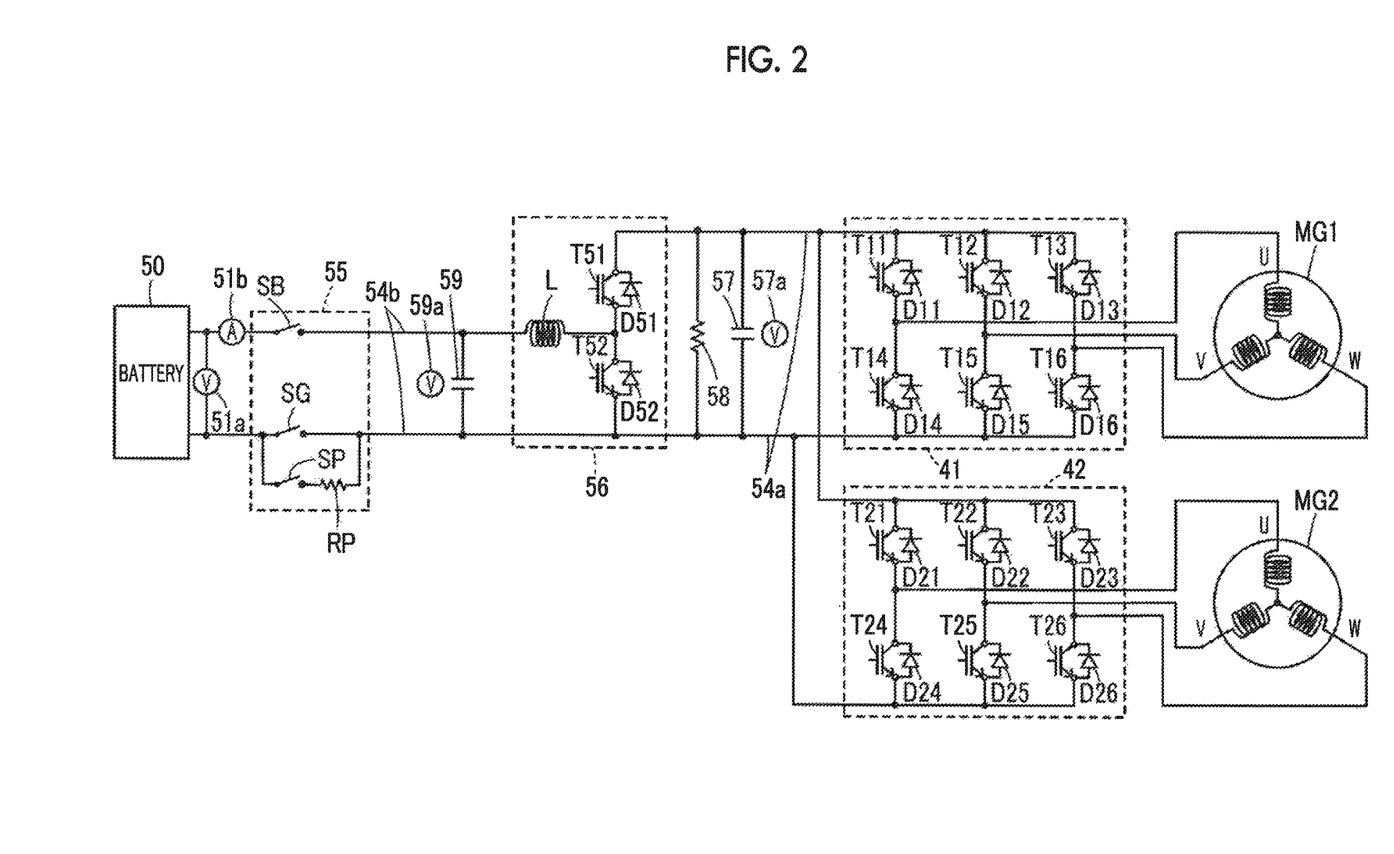
FIG. 2 is a configuration diagram schematically illustrating a configuration of an electrical system including motors.

The motor MG1 is configured as a known synchronous generator motor having a rotor with a permanent magnet embedded therein and a stator around which three-phase coils are wound, and as described above, the rotor of the motor MG1 is connected to the sun gear of the planetary gear 30. Like the motor MG1, the motor MG2 is configured as a synchronous generator motor, and the rotor of the motor MG2 is connected to the driving shaft 36. The motors MG1, MG2 are driven by control of the inverters 41, 42 by the motor ECU 40. The inverters 41, 42 are connected, via electric power lines (hereinafter, referred to as drive voltage system electric power lines) 54$a$, to the step-up converter 56 connected to electric power lines (hereinafter, referred to as battery voltage system electric power lines) 54$b$ to which the battery 50 and a system main relay 55 are connected. As illustrated in FIG. 2, the inverters 41, 42 are constituted by six transistors T11 to T16 and six transistors T21 to T26, and six diodes D11 to D16 and six diodes D21 to D26 respectively connected in antiparallel to the transistors T11 to T16 and the transistors T21 to T26. The transistors T11 to T16 and the transistors T21 to T26 are arranged in pairs of two transistors respectively disposed on the source side and the sink side with respect to the positive electrode bus and the negative electrode bus of the drive voltage system electric power lines 54$a$. The connecting points between the transistors forming the pairs are respectively connected to the three-phase coils (the U-phase, the V-phase, and the W-phase) of the motors MG1, MG2. Therefore, a rotating magnetic field can be formed in the three-phase coils by adjusting the proportions of the turn-on time of the transistors T11 to T16 and the transistors T21 to T26 forming pairs in a state in which a voltage is applied to the inverters 41, 42 such that the motors MG1, MG2 can be driven to rotate. Since the inverters 41, 42 share the positive electrode bus and the negative electrode bus of the drive voltage system electric power lines 54$a$, the electric power generated by one of the motors MG1, MG2 can be supplied to the other motors.

As illustrated in FIG. 2, the step-up converter 56 is configured as a step-up converter including two transistors T51, T52, two diodes D51, D52 connected in antiparallel to the transistors T51, T52, and a reactor L. The two transistors T51, T52 are respectively connected to the positive electrode bus of the drive voltage system electric power lines 54$a$, and the negative electrode buses of the drive voltage system electric power lines 54$a$ and the battery voltage system electric power lines 54$b$. The reactor L is connected to the connecting point between the transistors T51, 152 and the positive electrode bus of the battery voltage system electric power lines 54$b$. Therefore, by turning on and off the transistors T51, T52, the electric power of the battery voltage system electric power lines 54$b$ can be stepped up and supplied to the drive voltage system electric power lines 54$a$, or the electric power of the drive voltage system electric power lines 54$a$ can be stepped down and supplied to the battery voltage system electric power lines 54$b$.

A smoothing capacitor 57 for smoothing and a discharge resistor 58 for discharge are connected to the drive voltage system electric power lines 54$a$ in parallel. In addition, the system main relay 55 constituted by a positive electrode side relay SB, a negative electrode side relay SG, a precharge relay SP, and a precharge resistor RP is attached to the side of the battery voltage system electric power lines 54$b$ close to the output terminal of the battery 50. Furthermore, a smoothing filter capacitor 59 is connected to the side of the battery voltage system electric power lines 54$b$ close to the step-up converter 56.

Although not illustrated in the figure, the motor ECU 40 is configured as a microprocessor mainly including a CPU, and includes, in addition to the CPU, a ROM that stores processing programs, a RAM that temporarily stores data, input/output ports, and communication ports. Signals needed for controlling the driving of the motors MG1, MG2, for example, rotational positions θm1, θm2 from rotational position detection sensors 43, 44 that detect the rotational positions of the rotors of the motors MG1, MG2, and phase currents measured by a current sensor (not illustrated) and applied to the motors MG1, MG2 are input to the motor ECU 40 via the input ports. In addition, a voltage (the voltage of the drive voltage system electric power lines 54$a$, hereinafter, referred to as a drive voltage system voltage) VH of the smoothing capacitor 57 from a voltage sensor 57$a$ attached between the terminals of the smoothing capacitor 57, a voltage (the voltage of the battery voltage system electric power lines 54$b$, hereinafter, referred to as a battery voltage system voltage) VL of the filter capacitor 59 from a voltage sensor 59$a$ attached between the terminals of the filter capacitor 59, and the like are also input, to the motor ECU 40. Control signals for driving the inverters 41, 42 or the step-up converter 56, for example, switching control signals for the transistors T11 to T16 and the transistors T21 to T26 of the inverters 41, 42, switching control signals for the transistors T51, T52 of the step-up converter 56, and the like are output from the motor ECU 40 via the output ports. In addition, the motor ECU 40 communicates with the HVECU 70, controls the driving of the motors MG1, MG2 according to control signals from the HVECU 70, and outputs data regarding the operation state of the motors MG1, MG2 to the HVECU 70 as needed. The motor ECU 40 also calculates rotational speeds Nm1, Nm2 of the motors MG1, MG2 based on the rotational positions θm1, θm2 of the rotors of the motors MG1, MG2 from the rotational position detection sensors 43, 44.

For example, the battery 50 is configured as a lithium-ion secondary battery and exchanges electric power with the motors MG1, MG2 via the inverters 41, 42. Although not illustrated in the figure, the battery ECU 52 that manages the battery 50 is configured as a microprocessor mainly including a CPU, and includes, in addition to the CPU, a ROM that stores processing programs, a RAM that temporarily stores data, input/output ports, and communication ports. Signals needed for managing the battery 50, for example, a battery voltage Vb from a voltage sensor 51$a$ installed between the terminals of the battery 50, a battery current Ib from a current sensor 51$b$ attached to the electric power line connected to the output terminal of the battery 50, and a battery temperature Tb from a temperature sensor (not illustrated) attached to the battery 50, are input to the battery ECU 52 via the input ports. In addition, the battery ECU 52 communicates with the HVECU 70, and transmits data regarding the state of the battery 50 to the HVECU 70 as needed. To manage the battery 50, the battery ECU 52 calculates a stored power ratio SOC, which is the ratio of the capacity of the electric power from which the battery 50 can be discharged to the total capacity of the battery 50, based on the integrated value of the charge/discharge current Ib measured by the current sensor, or calculates input/output limits Win, gout, which are the maximum allowable electric powers at which the battery 50 can be charged or discharged, based on the calculated stored power ratio SOC and the battery temperature Tb.

Although not illustrated in the figure, the HVECU 70 is configured as a microprocessor mainly including a CPU, and includes, in addition to the CPU, a ROM that stores processing programs, a RAM that temporarily stores data, input/output ports, and communication ports. Various signals needed for drive control and the like, for example, an ignition signal from an ignition switch 80 and a vehicle speed V from a vehicle speed sensor 88, are input to the HVECU 70 via the input ports. In addition, a shift position SP from a shift position sensor 82 that detects the operation position of a shift lever 81, an accelerator operation amount Acc from an accelerator pedal position sensor 84 that measures the depression amount of an accelerator pedal 83, a brake pedal position BP from a brake pedal position sensor 86 that measures the depression amount of a brake pedal 85, and the like are also input to the HVECU 70. Control signals such as a drive signal for the system main relay 55 are output from the HVECU 70 via the output ports. As described above, the HVECU 70 is connected to the engine ECU 24, the motor ECU 40, and the battery ECU 52 via the communication ports, and exchanges various control signals and data with the engine ECU 24, the motor ECU 40, and the battery ECU 52.

The hybrid vehicle 20 of the example configured as described above travels in a hybrid traveling (HV traveling) mode or in an electric traveling (EV traveling) mode. Here, the HV traveling mode is a mode in which the hybrid vehicle 20 travels in accordance with the operation of the engine 22 while the engine 22 is operated, and the EV traveling mode is a mode in which the hybrid vehicle 20 travels without the operation of the engine 22.

Figure 3:
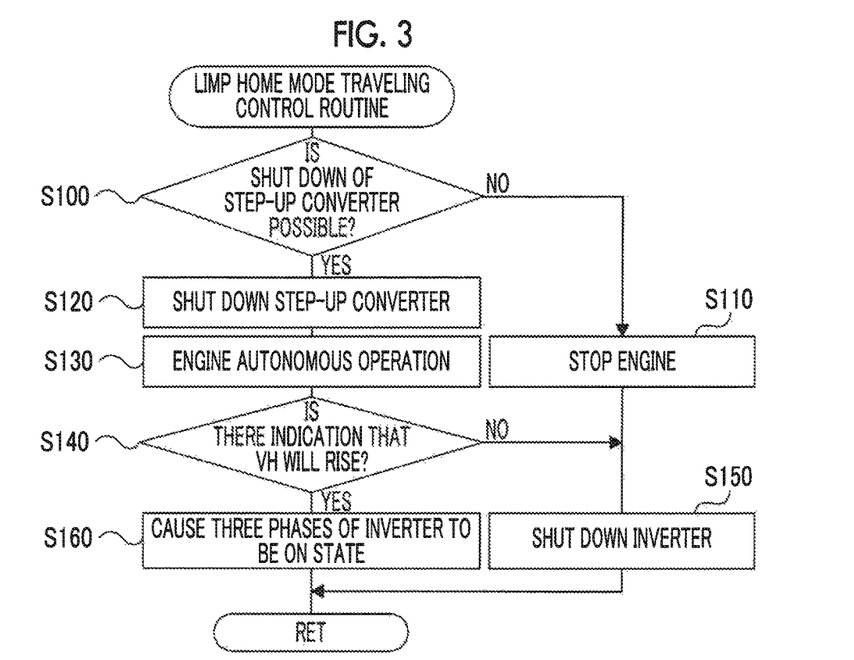
FIG. 3 is a flowchart showing an example of a limp home mode traveling control routine executed by an HVECU.

Next, the operation of the hybrid vehicle 20 of the example, and particularly, the operation in a limp home mode performed when an abnormality occurs in the step-up converter 56 and an abnormality occurs in the voltage sensor 57a that detects the drive voltage system voltage VH, will be described. FIG. 3 is a flowchart showing an example of a limp home mode traveling control routine executed by the HVECU 70 when the hybrid vehicle 20 travels in the limp home mode. The routine is repeatedly executed every predetermined time (for example, every several milliseconds).

Figure 4:
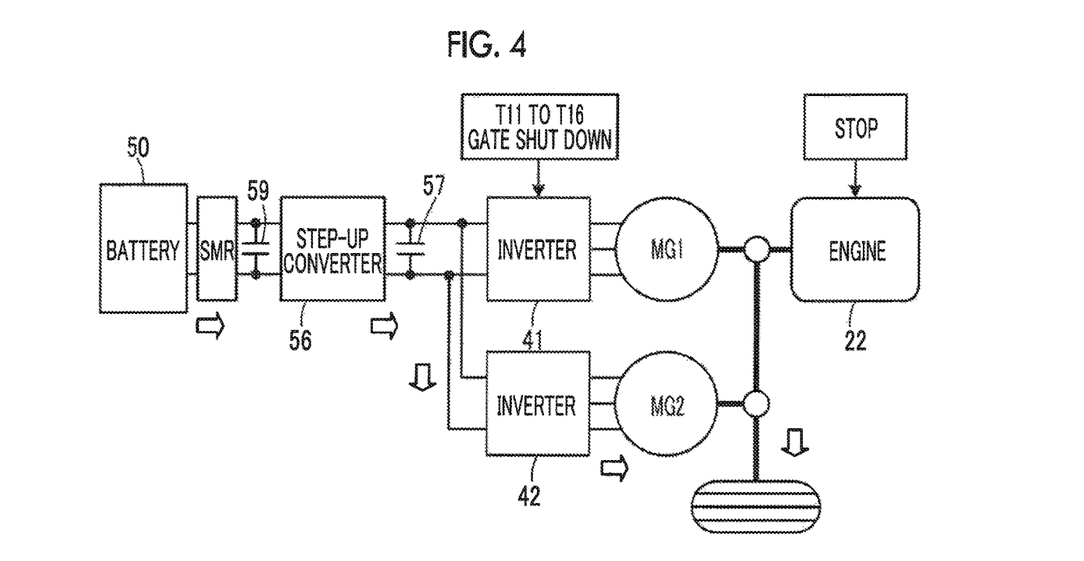
FIG. 4 is an explanatory view showing the flow of energy when the hybrid vehicle travels in a limp home mode in a state in which an engine is stopped and an operation of an inverter is stopped.
Figure 5:
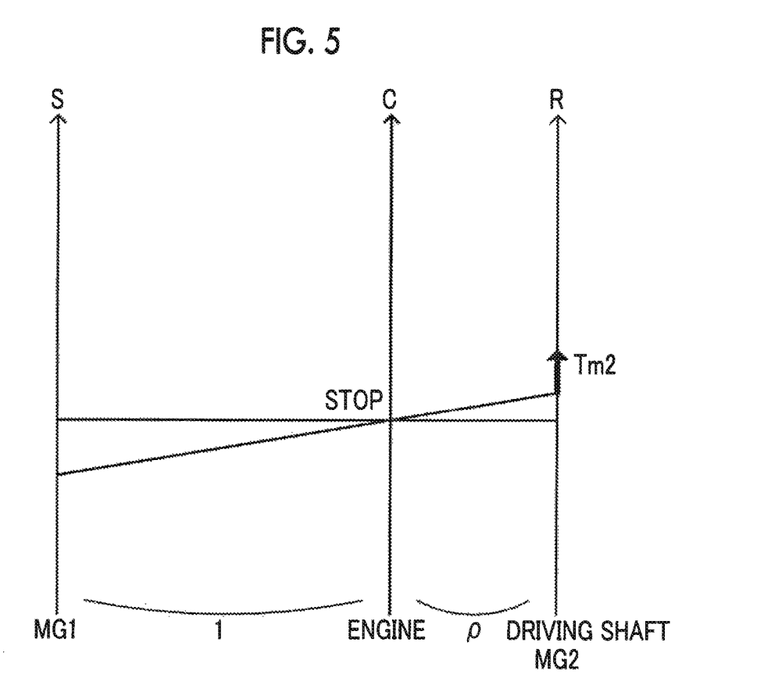
FIG. 5 is an explanatory view showing an example of a collinear diagram representing the mechanical relationship between the rotational speeds and torques of the rotating elements of a planetary gear when the hybrid vehicle travels in the limp home mode in the state in which the engine is stopped and the operation of the inverter is stopped.

When the limp home mode traveling control routine is executed, first, the HVECU 70 determines whether or not the transistors T51, T52 of the step-up converter 56 having an abnormality can be shut down (gate shut down) (step S100). The determination can be made based on whether or not an abnormality has occurred due to the transistor T51 fixed to the ON state, and the like. When the HVECU 70 determines that the transistors T51, T52 of the step-up converter 56 cannot be shut down (gate shut down), the engine 22 is stopped (step S110), the operation of the inverter 41 for driving the motor MG1 is stopped (gate shut down) (step S150), and the routine is ended. The stopping of the engine 22 is performed by transmitting a control signal for stopping the engine 22 to the engine ECU 24 and stopping fuel injection control and ignition control by the engine ECU 24 that has received the control signal. The stopping of the operation of the inverter 41 (gate shut down) is performed by transmitting a control signal for stopping the operation of the inverter 41 to the motor ECU 40 and turning off the transistors T11 to T16 of the inverter 41 by the motor ECU 40 that has received the control signal. The flow of energy when the hybrid vehicle 20 travels in the limp home mode in a state in which the engine 22 is stopped and the operation of the inverter 41 is stopped is shown in FIG. 4, and an example of a collinear diagram representing the mechanical relationship between the rotational speeds and torques of the rotating elements of the planetary gear 30 in this state is shown in FIG. 5. In FIG. 4, the outline arrows indicate the flow of energy. In FIG. 5, the S axis on the left represents the rotational speed of the sun gear, which is the rotational speed Nm1 of the motor MG1. The C axis represents the rotational speed of the carrier, which is the rotational speed Ne of the engine 22. The R axis represents the rotational speed Nr of the ring gear, which is the rotational speed Nm2 of the motor MG2. The thick arrow on the R axis indicates the torque output from the motor MG2 and exerted on the driving shaft 36. In the state in which the engine 22 is stopped and the operation of the inverter 41 is stopped, the electric power of the battery 50 is exerted on the drive voltage system electric power lines 54a via the step-up converter 56. Therefore, by switching control of the transistors T21 to T26 of the inverter 42 based on the voltage (battery voltage system voltage) VL of the battery voltage system electric power lines 54b, the motor MG2 can output a torque such that the hybrid vehicle 20 can travel.

When the HVECU 70 determines in step S100 that the transistors T51, T52 of the step-up converter 56 can be shut down (gate shut down), the transistors T51, T52 of the step-up converter 56 are shut down (gate shut down) (step S120), and the engine 22 is allowed to autonomously operate (step S130). The shutting down the transistors T51, T52 of the step-up converter 56 (gate shut down) is performed by transmitting a control signal for shutting down the transistors T51, T52 of the step-up converter 56 to the motor ECU 40 and turning off the transistors T51, T52 of the step-up converter 56 by the motor ECU 40 that has received the control signal. The autonomous operation of the engine 22 is performed by transmitting a control signal for allowing the engine 22 to autonomously operate to the engine ECU 24 and performing intake air amount control, injected fuel amount control, ignition control, and the like to allow the engine 22 to autonomously operate at a rotational speed predetermined by the engine ECU 24 that has received the control signal.

In addition, the HVECU 70 determines whether or not there is an indication that the drive voltage system voltage VH will rise (step S140). The indication that the drive voltage system voltage VH will rise can be obtained by determining that "there is an indication" when a motor needed power calculated by the product of a torque command Tm2* of the motor MG2 and the rotational speed Nm2 of the motor MG2 is equal to or lower than a predetermined power Pref, or when the accelerator operation amount Acc detected by the accelerator pedal position sensor 84 is equal to or lower than a predetermined operation amount Aref. The reason for this will be described later.

Figure 6:
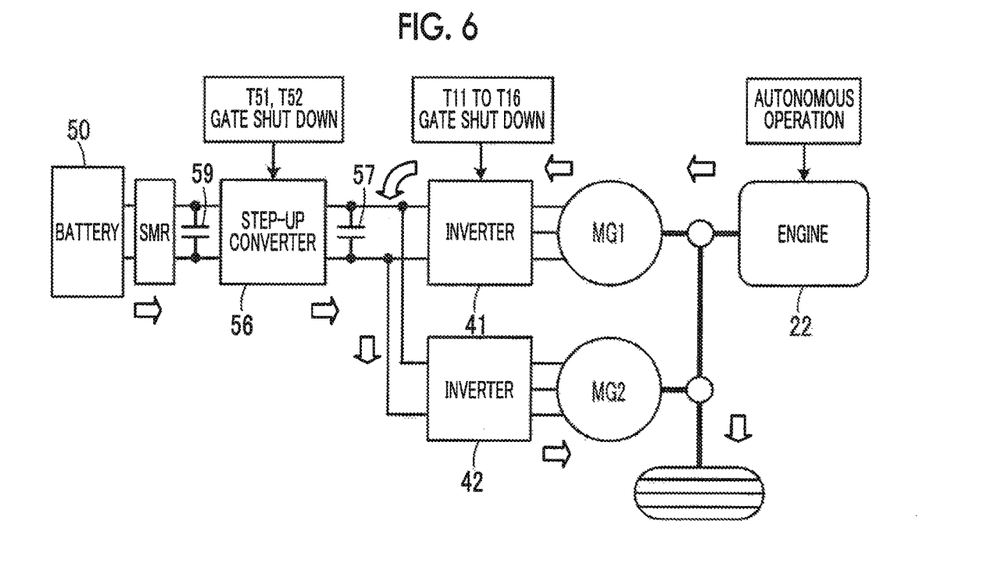
FIG. 6 is an explanatory view showing the flow of energy when the hybrid vehicle travels in the limp home mode by allowing the engine to autonomously operate in a state in which stepping up by a step-up converter and the operation of the inverter are stopped.
Figure 7:
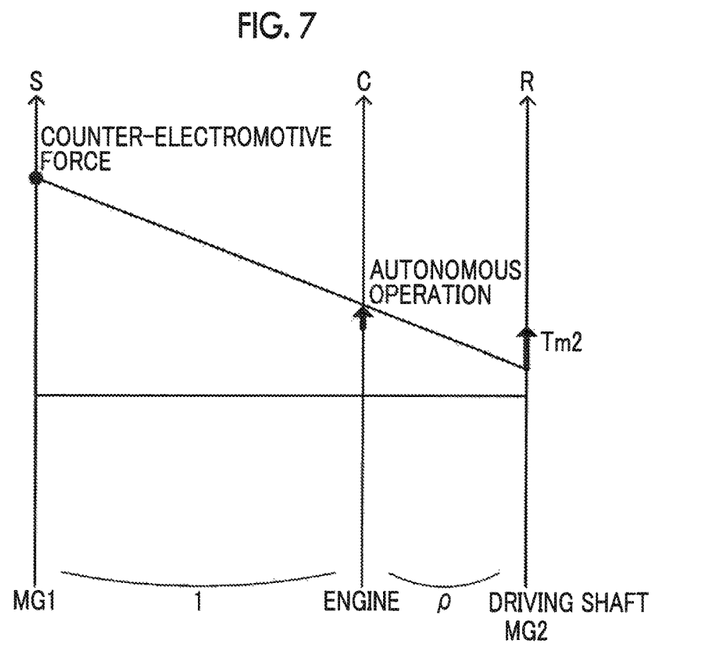
FIG. 7 is an explanatory view showing an example of a collinear diagram representing the mechanical relationship between the rotational speeds and torques of the rotating elements of the planetary gear when the hybrid vehicle travels in the limp home mode by allowing the engine to autonomously operate in the state in which the stepping up by the step-up converter and the operation of the inverter are stopped.

When the HVECU 70 determines in step S140 that there is no indication that the drive voltage system voltage VH will rise, the drive voltage system voltage VH is determined to be maintained at the battery voltage system voltage VL, the operation of the inverter 41 that drives the motor MG1 is stopped (gate shut down) (step S150), and the routine is ended. In this state, the hybrid vehicle 20 travels in the limp home mode by allowing the engine 22 to autonomously operate in the state in which the stepping up by the step-up converter 56 and the operation of the inverter 41 are stopped. The flow of energy when the hybrid vehicle 20 travels in the limp home mode in this state is shown in FIG. 6, and an example of a collinear diagram representing the mechanical relationship between the rotational speeds and torques of the rotating elements of the planetary gear 30 when the hybrid vehicle 20 travels in the limp home mode in this state is shown in FIG. 7. When the engine 22 autonomously operates, the motor MG1 rotates with the autonomous operation of the engine 22, and a counter-electromotive force is generated in the motor MG1. When the operation of the inverter 41 is stopped, the diodes D11 to D16 of the inverter 41 function as a rectifying circuit. Therefore, the counter-electromotive force generated in the motor MG1 is supplied to the inverter 42 and is consumed by the motor MG2. Since the drive voltage system voltage VH is maintained at the battery voltage system voltage VL, the drive control of the motor MG2 can be performed by switching control of the transistors T21 to T26 of the inverter 42 based on the battery voltage system voltage VL. In the limp home mode, since the counter-electromotive force generated in the motor MG1 by the autonomous operation of the engine 22 and the rotation of the motor MG1 with the autonomous operation of the engine 22 is used, compared to a case where the hybrid vehicle 20 travels solely with discharge electric power from the battery 50, the hybrid vehicle 20 can travel using higher electric power, and the traveling distance of the hybrid vehicle 20 can be increased. The rotational speed during the autonomous operation of the engine 22 is the rotational speed at which a certain degree of counter-electromotive force is generated in the motor MG1.

Figure 8:
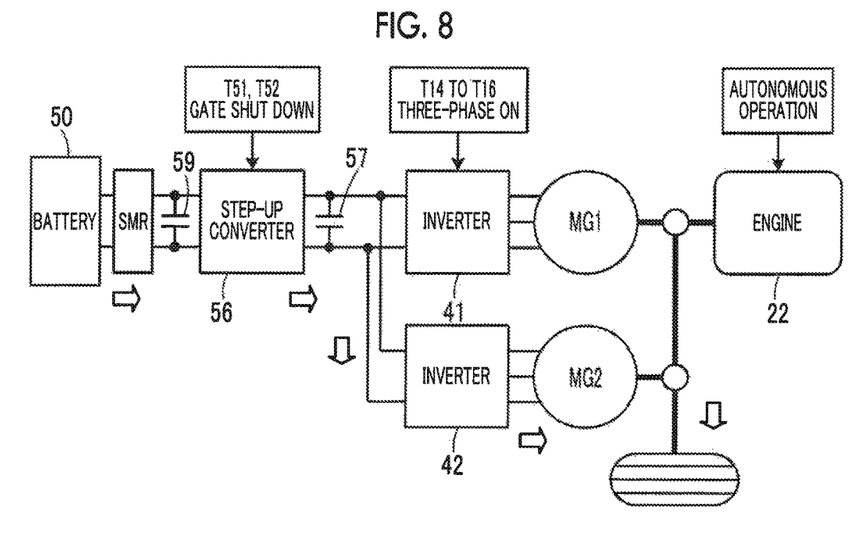
FIG. 8 is an explanatory view showing the flow of energy when the hybrid vehicle travels in the limp home mode by allowing the engine to autonomously operate in a state in which the stepping up by the step-up converter is stopped and the inverter causes three phases to be in an ON state.
Figure 9:
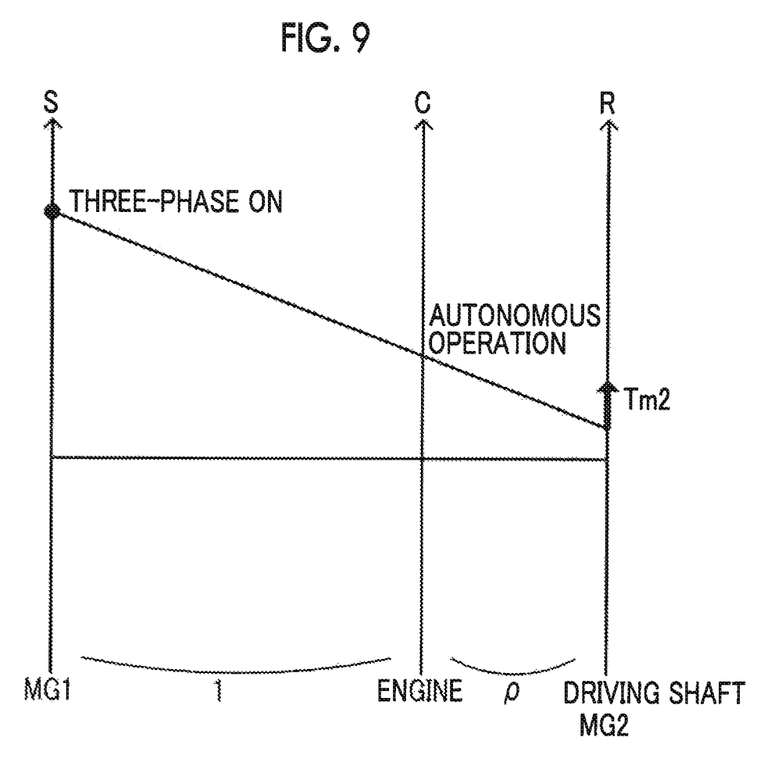
FIG. 9 is an explanatory view showing an example of a collinear diagram representing the mechanical relationship between the rotational speeds and torques of the rotating elements of the planetary gear when the hybrid vehicle travels in the limp home mode by allowing the engine to autonomously operate in the state in which the stepping up by the step-up converter is stopped and the inverter causes the three phases to be in the ON state.

When the HVECU 70 determines in step S140 that there is an indication that the drive voltage system voltage VH will rise, the inverter 41 causes three-phase ON (step S160), and the routine is ended. The three-phase ON of the inverter 41 can be performed by transmitting a control signal for causing three-phase ON of the inverter 41 to the motor ECU 40, and turning on the transistors T11 to T13 constituting the upper arm of the inverter 41 or the transistors T14 to T16 constituting the lower arm of the inverter 41 by the motor ECU 40 that has received the control signal. In this state, in the state in which the stepping up by the step-up converter 56 is stopped and the inverter 41 causes the three-phase ON, the engine 22 autonomously operates and the hybrid vehicle 20 travels in the limp home mode. The flow of energy when the hybrid vehicle 20 travels in the limp home mode in this state is shown in FIG. 8, and an example of a collinear diagram representing the mechanical relationship between the rotational speeds and torques of the rotating elements of the planetary gear 30 when the hybrid vehicle 20 travels in the limp home mode in this state is shown in FIG. 9. When the three-phase of the inverter 41 is caused to be ON, a closed circuit is formed in the U-phase, the V-phase, and the W-phase of the motor MG1, and no counter-electromotive force is generated in the motor MG1. Therefore, the motor MG2 is driven solely using the electric power from the battery 50.

Even when the HVECU 70 determines that there is an indication that the drive voltage system voltage VH will rise, when the engine 22 autonomously operates and the hybrid vehicle 20 travels in the limp home mode in the state in which the operation of the inverter 41 is stopped as when the HVECU 70 determines that there is no indication, the drive voltage system voltage VH rises due to the counter-electromotive force in the motor MG1. In this case, an abnormality occurs in the voltage sensor 57a that detects the drive voltage system voltage VH, and the drive control of the motor MG2 performed assuming that the drive voltage system voltage VH is equal to the battery voltage system voltage VL fails. In the example, in order to avoid the failure of the drive control of the motor MG2, the inverter 41 is allowed to cause the three-phase ON when the HVECU 70 determines that there is an indication that the drive voltage system voltage VH will rise.

Next, the reason that the HVECU 70 can determine that "there is an indication that the drive voltage system voltage VH will rise" when the motor needed power calculated by the product of the torque command Tm2* of the motor MG2 and the rotational speed Nm2 of the motor MG2 is equal to or lower than the predetermined power Pref, or when the accelerator operation amount Acc detected by the accelerator pedal position sensor 84 is equal to or lower than the predetermined operation amount Aref will be described. In a case where the hybrid vehicle 20 travels by controlling the driving of the motor MG2 using the counter-electromotive force of the motor MG1 and the discharge electric power from the battery 50, the torque of the motor MG2 decreases and the power consumption decreases. In this case, the counter-electromotive force of the motor MG1 becomes excessive, and the drive voltage system voltage VH rises. Therefore, when the power consumption of the motor MG2 decreases, that is, when the motor needed power decreases to a predetermined power or lower, the HVECU 70 can determine that there is an indication that the drive voltage system voltage VH will rise. In a case where the hybrid vehicle 20 travels solely using the torque from the motor MG2, when the motor needed power decreases is synonymous with when the power needed for traveling decreases. This case corresponds to when the accelerator pedal 83 depressed by the driver is returned. Therefore, when the accelerator operation amount Acc decreases to the predetermined operation amount or lower, the HVECU 70 can determine that there is an indication that the drive voltage system voltage VH will rise.

Figure 10:
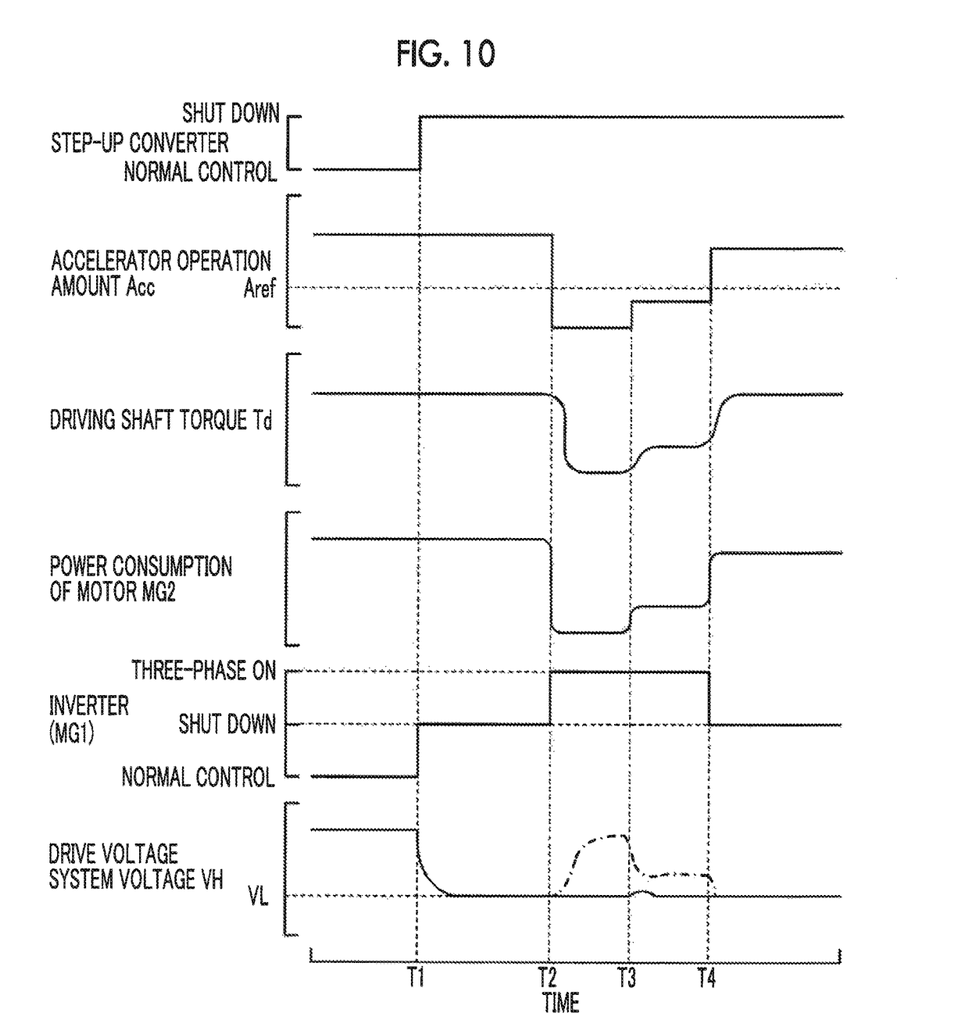
FIG. 10 is an explanatory view showing an example of temporal changes of a drive torque and the states of the inverter and the like when the hybrid vehicle travels in the limp home mode by stopping the operation of the inverter or causing the three-phase ON in the state in which the stepping up by the step-up converter is stopped.

FIG. 10 is an explanatory view showing an example of temporal changes of a drive torque Td and the states of the inverter 41 and the like when the hybrid vehicle 20 travels in the limp home mode by stopping the operation of the inverter 41 or allowing the inverter 41 to cause the three-phase ON in the state in which the stepping up by the step-up converter 56 is stopped when an abnormality occurs in the voltage sensor 57a that detects the drive voltage system voltage VH. In FIG. 10, the dot-dash line of the drive voltage system voltage VH indicates while the operation of the inverter 41 is stopped. At time T1 at which the stepping up by the step-up converter 56 is stopped due to an abnormality in the step-up converter 56 when an abnormality occurs in the voltage sensor 57a that detects the drive voltage system voltage VH, the operation of the inverter 41 is stopped and the engine 22 autonomously operates. Therefore, the counter-electromotive force is generated in the motor MG1, the drive voltage system voltage VH rapidly becomes the battery voltage system voltage VL, and the driving of the motor MG2 is controlled based on the battery voltage system voltage VL assuming that the drive voltage system voltage VH is equal to the battery voltage system voltage VL. At time T2 at which the accelerator pedal 83 depressed by the driver is suddenly returned, the accelerator operation amount Acc becomes the predetermined operation amount Aref or lower by the accelerator operation, and the HVECU 70 determines that there is an indication that the drive voltage system voltage VH will rise, thereby allowing the inverter 41 to cause the three-phase ON. Therefore, the counter-electromotive force is not generated in the motor MG1, and the drive voltage system voltage VH is maintained at the battery voltage system voltage VL, and the drive control of the motor MG2 based on the battery voltage system voltage VL is continued without failure. On the other hand, as indicated by the dot-dash line, when the state in which the operation of the inverter 41 is stopped is maintained while the inverter 41 does not cause the three-phase ON, the drive voltage system voltage VH rises, and the drive control of the motor MG2 based on the battery voltage system voltage VL fails. At time T3 at which the driver slightly depresses the accelerator pedal 83, the accelerator operation amount Acc is the predetermined operation amount Aref or lower, and the three-phase ON of the inverter 41 is continued. At time T4 at which the driver further depresses the accelerator pedal 83, the accelerator operation amount Acc becomes greater than the predetermined operation amount Aref, the three-phase ON of the inverter 41 is released, and the operation of the inverter 41 is stopped. Therefore, the counter-electromotive force is generated in the motor MG1, and the counter-electromotive force can be consumed by the motor MG2 such that the hybrid vehicle 20 can travel.

In the hybrid vehicle 20 of the example described above, when an abnormality occurs in the step-up converter 56 and an abnormality occurs in the voltage sensor 57a that detects the drive voltage system voltage VH, the hybrid vehicle 20 travels by allowing the engine 22 to autonomously operate in the state in which the stepping up by the step-up converter 56 is stopped. In this case, when the HVECU 70 determines that there is no indication that the drive voltage system voltage VH will rise, the operation of the inverter 41 that drives the motor MG1 is stopped, and the counter-electromotive force generated in the motor MG1 is consumed by the motor MG2 such that the hybrid vehicle 20 travels. Accordingly, compared to the case where the hybrid vehicle 20 travels solely with the discharge electric power from the battery 50, the traveling distance of the hybrid vehicle 20 can be increased, and the hybrid vehicle 20 can travel at a higher vehicle speed. When the HVECU 70 determines that there is an indication that the drive voltage system voltage VH will rise, the hybrid vehicle 20 travels by allowing the inverter 41 that drives the motor MG1 to cause the three-phase ON with no counter-electromotive force generated in the motor MG1. Accordingly, the rise of the drive voltage system voltage VH is suppressed, failure of the drive control of the motor MG2 based on the battery voltage system voltage VL is avoided, and the limp home mode can be continued.

Figure 11:
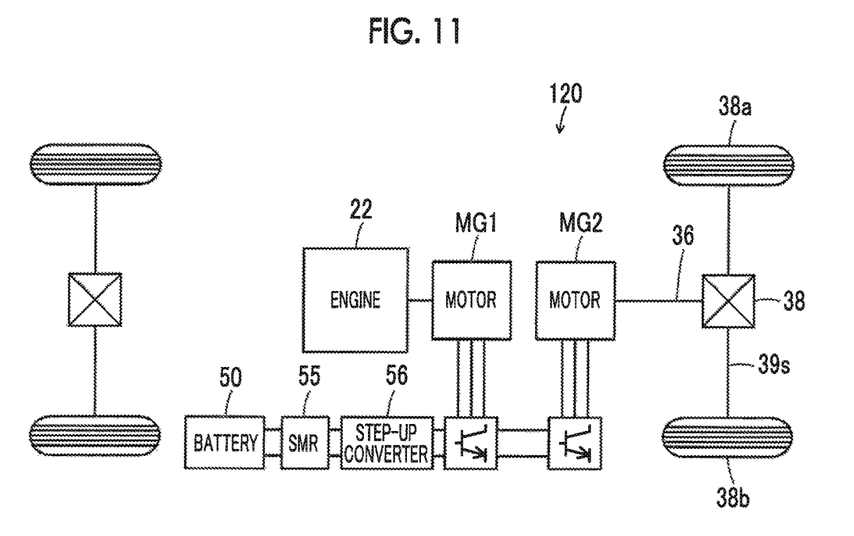
FIG. 11 is a configuration diagram schematically illustrating a configuration of a hybrid vehicle of a modification example.

The hybrid vehicle 20 of the example is configured such that the ring gear of the planetary gear 30 and the motor MG2 are connected to the driving shaft 36 connected to the driving wheels 38a, 38b and the sun gear and the carrier of the planetary gear 30 are respectively connected to the motor MG1 and the engine 22. However, any configuration can be employed as long as an engine, a generator that is rotated along with the rotation of the engine and generates a counter-electromotive force, a motor that can output a traveling power, a first inverter for driving the generator, a second inverter for driving the motor, a power storage device, and a step-up converter are included. For example, as illustrated in a hybrid vehicle 120 of a modification example of FIG. 11, the configuration of a so-called series hybrid vehicle in which a motor MG2 for traveling is connected to a driving shaft 36 connected to driving wheels 38a, 38b and a motor MG1 for power generation is connected to the output shaft of an engine 22 may be employed.

In the hybrid vehicle 20 of the example, the battery 50 is connected to the battery voltage system electric power lines 54b. However, a capacitor may also be used instead of the battery 50.

The correspondence between the main elements of the example and the main elements of the present disclosure described in "SUMMARY" will be described. In the example, the engine 22 corresponds to "engine", the motor MG1 corresponds to "generator", the motor MG2 corresponds to "motor", the inverter 41 corresponds to "first inverter", the inverter 42 corresponds to "second inverter", the battery 50 corresponds to "power storage device", the step-up converter 56 corresponds to "step up converter", the smoothing capacitor 57 corresponds to "capacitor", the voltage sensor 57a corresponds to "voltage sensor", and the HVECU 70, the engine ECU 24, the motor ECU 40, and the battery ECU 52 correspond to "electronic control unit" in the description. However, the correspondence is an example.

The correspondence between the main elements of the example and the main elements of the present disclosure described in "SUMMARY" is an example for specifically describing the embodiments for carrying out the present disclosure described in "SUMMARY" by the example, and does not limit the elements of the present disclosure described in "SUMMARY". That is, the interpretation of the present disclosure described in "SUMMARY" should be made based on the description in "SUMMARY", and the example is merely a specific example of the present disclosure described in "SUMMARY".

Although the embodiments for carrying out the present disclosure have been described above using the examples, the applicable embodiment of the present disclosure is not limited to the examples, and various modifications may be made without departing from the gist of the present disclosure.

The present disclosure is applicable to the manufacturing industry of hybrid vehicles and the like.

What is claimed is:
1. A hybrid vehicle comprising:
an engine;
a generator configured to generate a counter-electromotive force due to rotation of the engine;
a motor configured to output a traveling power of the hybrid vehicle;
a first inverter configured to drive the generator;
a second inverter configured to drive the motor;
a power storage device;
a first voltage system electric power line connected to the power storage device;
a second voltage system electric power line connected to the first inverter and the second inverter;
a step-up converter connected to the first voltage system electric power line and the second voltage system electric power line, the step-up converter being configured to step up a direct-current electric power of the first voltage system electric power line and supply the direct-current electric power to the second voltage system electric power line;
a smoothing capacitor attached to the second voltage system electric power line;
a voltage sensor configured to detect a voltage between terminals of the capacitor; and
an electronic control unit configured to control the engine, the first inverter, the second inverter, and the step-up converter, control the step-up converter to stop the stepping up by the step-up converter when the electronic control unit determines that an abnormality occurs in the voltage sensor, and control the first inverter to cause three phases of the first inverter to be in an ON state when the hybrid vehicle travels by driving the engine in a state in which an operation of the first inverter is stopped, and the electronic control unit determines that there is an indication that a voltage of the capacitor will rise.

2. The hybrid vehicle according to claim 1, wherein the electronic control unit is configured to determine that there is an indication that the voltage of the capacitor will rise when a power needed for the motor becomes a predetermined power or lower due to an operation of a driver of the hybrid vehicle.

3. The hybrid vehicle according to claim 1, further comprising an accelerator operation amount sensor configured to detect an operation amount of an accelerator pedal configured to be operated by a driver of the hybrid vehicle, wherein the electronic control unit is configured to determine that there is an indication that the voltage of the capacitor will rise when an accelerator operation amount detected by the accelerator operation amount sensor becomes a predetermined value or lower.

4. The hybrid vehicle according to claim 1, wherein the electronic control unit is configured to control the first inverter to stop an operation of the first inverter when the electronic control unit determines that there is no indication that the voltage of the capacitor will rise.

* * * * *